Sept. 2, 1958
F. J. KINDL
2,850,307
VALVE STEMS
Filed July 1, 1955
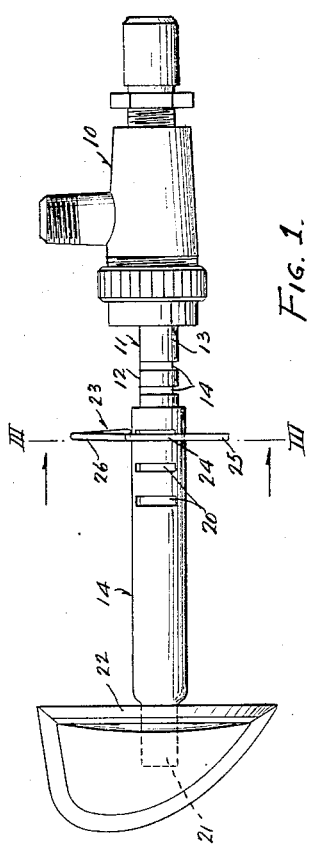
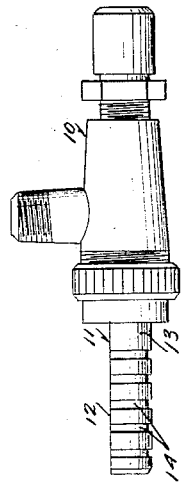
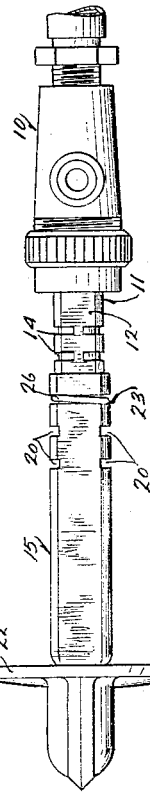
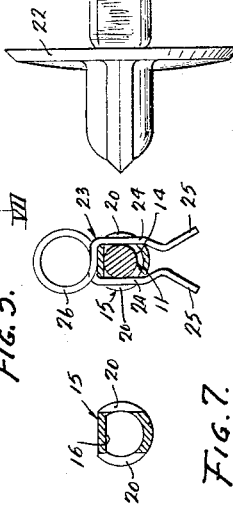
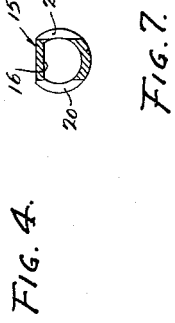
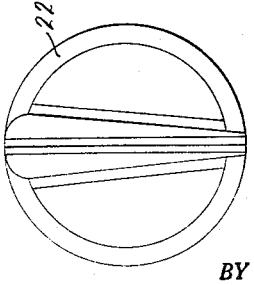
INVENTOR.
FRANKLIN J. KINDL.
BY
Beau, Brooks, Buckley & Beau.
ATTORNEYS United States Patent Office 2,850,307
Patented Sept. 2, 1958

2,850,307

VALVE STEMS

Franklin J. Kindl, Chagrin Falls, Ohio, assignor to Bell Aircraft Corporation, Wheatfield, N. Y.

Application July 1, 1955, Serial No. 519,381

3 Claims. (Cl. 287—58)

My invention relates in general to the stems of gas valves such as are used on domestic gas ranges, and particularly to a valve stem which is adjustable lengthwise.

The principal object of my invention is to provide an adjustable valve stem which will securely lock the parts together and prevent relative rotary axial movement therebetween.

Another object is to provide an adjustable valve stem which may be very easily adjusted to the desired length and which may be securely held in place by means of a spring clip.

Moreover, my device is of such a nature that the locking means may be carried in an inactive position by the extension member and readily rotated to locked or unlocked position.

The above objects and advantages have been accomplished by the device shown in the accompanying drawings, of which:

Fig. 1 is a side elevation of a gas valve embodying my invention;

Fig. 2 is a plan view thereof;

Fig. 3 is a sectional view taken on line III—III of Fig. 1;

Fig. 4 is a face view of the handle of the valve;

Fig. 5 is a side elevation of the valve stem extension member;

Fig. 6 is a side elevation of the valve showing the stem thereof formed to adapt it to my invention; and Fig. 7 is a sectional elevation of the extension member taken on line VII—VII of Fig. 5.

In the drawings, 10 represents a gas valve of the usual type which is shown in the position it would occupy if it were mounted in a recess or drop-in top section of a gas burner unit. In accordance with my invention the control shaft comprises a stem 11 of this valve is preferably of D-shape cross section and it is provided with a flat side 12 and a circular periphery 13. A plurality of spaced grooves 14 are formed in the circular periphery of the stem. A tubular extension member 15 is mounted upon the main valve stem and it is formed with a bore 16 substantialy of D-shape having a flattened side 17 designed to engage the flat surface 12 of the valve stem when in assembled position and a circular portion for engagement with the circular peripheral surface of the main stem. This extension member is formed with a plurality of slots 20 in its opposite side walls which are spaced preferably a distance equal to the spacings of the grooves 13 of the main valve stem. The provision of the D-shaped valve stem and bore of the extension member serve to provide nonrotative coupling of the two parts. The extension member is provided with a forwardly projecting handle fastening member 21 which is press fitted into the handle 22 of the valve. The fit of the fastening member with the bore of the handle is such that the valve extension member may be moved axially with relation to the valve stem without danger of its becoming disengaged.

The locking member of my invention comprises a spring clip 23 having oppositely arranged spaced legs 24, each terminating in a flaring end 25. The upper ends of the legs are preferably connected by means of a yieldable ring-shaped member 26 which serves to urge the legs 24 toward each other. When the extension member has been moved to the position upon the valve stem to obtain the desired length of stem from the handle to the valve body, the spring clip is forced downwardly through selected slots 20 and engages with registering grooves 13 of the valve stem, the flared ends 25 serving to facilitate such engagement. When so engaged the side members 24 will prevent axial movement of the parts. When it is desired to remove the spring clip it is only necessary to engage the yieldable member 20 of the clip with a suitable tool and rotate it through substantially 90°. When rotated, the yieldable arms 24 of the clip will be drawn out of engagement with the coacting slots and grooves 13 and will then lie horizontally upon the flat surface 15 of the extension member and upon the opposite circular surface thereof, whereupon the extension member will be unlocked and may be withdrawn from its engagement with the main valve stem. When reassembling my device, it is only necessary to slide the extension member over the main valve stem to the approximate distance desired and then with the same tool again rotate the spring clip through 90° to a vertical position as shown in Fig. 3. The legs of the clip will thereby engage the adjacent slots of the members and if the legs are not then in registration with either pair of grooves of the main valve stem, slight axial movement in either direction will bring them in engagement with the registering grooves.

Obviously, instead of providing the main valve stem with a flat surface for engagement with a similar surface of the extension member, the valve stem may be provided with a groove at one side which would be engaged by a suitable extension formed on the extension member to prevent relative rotation of the parts.

These and other modifications of the details herein shown and described may be made without departing from the spirit of the invention or the scope of the appended claims.

What is claimed is:

1. An adjustable control member for a gas valve having a rotary plug, said member comprising a shank of D-shaped cross section carried by said plug and having a curved surface and a flat surface joining the curved surface thereof, and a hollow extension sleeve having a bore of D-shaped cross section thereby having a curved inner wall portion and a flat inner wall portion joining the curved wall portion thereof, said sleeve being slidably but nonrotatably mounted upon said shank, said shank having a plurality of pairs of grooves formed in the curved surface on each side of the flat surface portion thereof, said sleeve having a plurality of pairs of oppositely spaced slots formed through the curved wall portions thereof on each side of the flat wall portion thereof, and spring clip means having a pair of legs in substantially parallel arrangement disposed in the slots of said sleeve and the registering grooves of said shank, whereby said sleeve is releasably locked in adjusted position on said shank against axial movement relative thereto.

2. An adjustable control member for a gas valve having a rotary plug, said member comprising a shank of D-shaped cross section carried by said plug and having a curved surface and a flat surface joining the curved surface thereof, and a hollow extension sleeve having a bore of D-shaped cross section thereby having a curved inner wall portion and a flat inner wall portion joining the curved wall portion thereof, said sleeve being slidably but nonrotatably mounted upon said shank, said shank having a plurality of pairs of grooves formed in the curved surface on each side of the flat surface portion thereof, said sleeve having a plurality of pairs of oppositely spaced slots formed through the curved wall portions thereof on each side of the flat wall portion thereof, and spring clip means having a pair of legs in substantially parallel arrangement disposed in the slots of said sleeve and the registering grooves of said shank, said legs terminating in reentrant ends having outwardly flaring extensions for locking engagement with said stem, whereby said sleeve is releasably locked in adjusted position on said shank against axial movement relative thereto.

3. An adjustable control member for a gas valve having a rotary plug, said member comprising a shank of D-shaped cross section carried by said plug and having a curved surface and a flat surface joining the curved surface thereof, and a hollow extension sleeve having a bore of D-shaped cross section thereby having a curved inner wall portion and a flat inner wall portion joining the curved wall portion thereof, said sleeve being slidably but non-rotatably mounted upon said shank, said shank having a plurality of pairs of grooves formed in the curved surface on each side of the flat surface portion thereof, said sleeve having a plurality of pairs of oppositely spaced slots formed through the curved wall portions thereof on each side of the flat wall portion thereof, and a spring clip, comprising a yieldable ring shaped member terminating in a pair of substantially parallel legs having their connecting portions in overlapping relation and so disposed as to engage the flat surface of said shank, whereby said sleeve is releasably locked in adjusted position on said shank against axial movement relative thereto.

References Cited in the file of this patent
UNITED STATES PATENTS

| Number | Name | Date |
|---|---|---|
| 63,231 | Doty | Mar. 26, 1867 |
| 727,347 | Blover | May 5, 1903 |
| 1,114,123 | Dalton | Oct. 20, 1914 |
| 2,298,858 | Creager | Oct. 13, 1932 |
| 2,376,716 | Odin | May 22, 1945 |
| 2,438,633 | Condor | Mar. 30, 1948 |
| 2,693,368 | Petron | Nov. 2, 1954 |
| 2,705,119 | Ingwer | Mar. 29, 1955 |